United States Patent [19]

Kasahara

[11] Patent Number: 4,771,348

[45] Date of Patent: Sep. 13, 1988

[54] CARRIAGE MOVING APPARATUS FOR A MAGNETIC DISK

[75] Inventor: Akihiro Kasahara, Chigasaki, Japan

[73] Assignee: Kabushiki Kaisha Toshiba, Kawasaki, Japan

[21] Appl. No.: 903,324

[22] Filed: Sep. 3, 1986

[30] Foreign Application Priority Data

Sep. 3, 1985 [JP] Japan .................................. 60-193118
Oct. 1, 1985 [JP] Japan .................................. 60-216232

[51] Int. Cl.$^4$ ............................................. G11B 21/08
[52] U.S. Cl. .................................................... 360/106
[58] Field of Search ......................................... 360/106

[56] References Cited

U.S. PATENT DOCUMENTS

| 4,161,004 | 7/1979 | Dalziel .................................. 360/106 |
| 4,366,722 | 1/1983 | Hasler .................................. 74/99 R |
| 4,456,937 | 6/1984 | Iftikar et al. ......................... 360/106 |
| 4,622,608 | 11/1986 | Mabuchi ............................... 360/106 |

Primary Examiner—Robert S. Tupper
Attorney, Agent, or Firm—Foley & Lardner, Schwartz, Jeffery, Schwaab, Mack, Blumenthal & Evans

[57] ABSTRACT

A magnetic head moving apparatus, comprises a carriage which has a magnetic head placed on it, for guiding the magnetic head back and forth in a predetermined direction, a motor for driving the carriage, a flexible band wound around the rotating shaft of the motor, with its one end fixed to the carriage and the other end is supported by the carriage, and a device means for giving a tension which is fixed to the carriage, for giving a tension to the flexible band, one end of the tension giving device being fixed to the carriage, the other end thereof being engaged with the vicinity of the one end of the flexible band, giving a predetermined tension to the flexible band by applying a force in a direction substantially perpendicular to the longitudinal direction of the flexible band.

14 Claims, 12 Drawing Sheets

CARRIAGE MOVING APPARATUS FOR A MAGNETIC DISK

BACKGROUND OF THE INVENTION

1. Field of the Invention

The present invention relates to a magnetic disc apparatus, and more particularly to a magnetic head moving apparatus which sends the magnetic head in a prescribed direction by moving it.

2. Description of the Prior Art

The principal part of the magnetic head moving apparatus which is currently in the widest use in magnetic disc devices has a construction as shown in FIG. 1 and FIG. 2.

Namely, a magnetic head 101 is fixed via a flexer 102 to a head stand 103, and the head stand 103 is fixed by guides 104 and pulleys 105 to a carriage 106 which is supported so as to be movable only in the direction A (the radial direction of the magnetic disc) in the figures. On the carriage 106 there are fixed both ends of a flexible band 110 whose central portion is wound and fixed to the periphery of a roller 109 that is fitted to the shaft 108 of a stepping motor 107.

Because of such a construction, by rotating the stepping motor 107, it is possible to move the carriage 106 in parallel in the direction A of the figure for a distance which is proportional to the angle of rotation of the motor. In order to enhance the positional accuracy of the magnetic head 101 by fixing the flexible band 110 to the carriage 106 without sag, a method has been employed in the past in which a fixed tension is given to the flexible band 110 by fixing it to the carriage 106 via a punched rectangular elastic member 111 that is provided on one end of the flexible band 110.

However, in a magnetic head moving apparatus with the construction as in the above, the flexible band 110 is to be fixed via the elastic member 111 to the carriage 106 with screws or the like under a strained condition so that it requires special fixing tools and it used to deteriorate the workability. Moreover, it used to be not easy to fix the flexible band 110 under appropriate tension because of the twist in the flexible band 110 at the time of its fixing with screws or of the change in the tension after fixing, that tend to be generated.

Furthermore, in a magnetic head moving apparatus constructed as in the above, the accuracy of setting in the direction of height, as shown by the direction B in FIG. 2, of the flexible band 110 depends upon the manufacturing accuracy of the carriage 106 and the form accuracy of the elastic member 111, so that it was not possible to eliminate the errors in the height of setting because of the errors in the accuracy of these members.

Still further, the attached position, on the roller 109, of the flexible band 100 does not change so that in winding the flexible band 110 on the roller 109, the roller 109 necessarily moves relatively in the horizontal direction. In this case, if the flexible band 110 is set with some error in its height and is slightly tilted instead of being perfectly horizontal, the length of the flexible band 110 is changed by expanding or contracting the elastic member 111, depending upon the position of the roller 109 and the carriage 106. In practice, the flexible band 110 has to have a larger length when it is in the vicinity of the end of the carriage 106 than in the case when it is in the vicinity of the center of the carriage 106, with an expansion of the elastic member 111 and a corresponding change in the tension. Because of this change in tension, the feeding accuracy of the magnetic head 101 will deteriorate.

SUMMARY OF THE INVENTION

An object of the present invention which was conceived in view of the above circumstances is to provide a magnetic head moving apparatus which permits an easy setting of the flexible band, and separate setting for fixing and tension adjustment thereof, and moreover, makes it possible to carry out a stabilized magnetic head motion by providing an adequate tension for the flexible band.

Another object of the present invention is to provide a magnetic head moving apparatus which eliminates the errors in the setting height of the flexible band on the carriage, and enhances the feeding accuracy of the magnetic head without creating changes in the tension during winding of the flexible band.

With the above objects in view, the present invention resides in a magnetic head moving apparatus, comprising a carriage which has a magnetic head placed on it, for guiding the magnetic head back and forth in a predetermined direction, a motor for driving said carriage, a flexible band wound around the rotating shaft of said motor, with its one end fixed to said carriage and the other end is supported by said carriage, and means for giving a tension which is fixed to said carriage, for giving a tension to said flexible band, one end of said tension giving means being fixed to said carriage, the other end thereof being engaged with the vicinity of said one end of said flexible band, giving a predetermined tension to said flexible band by applying a force in a direction substantially perpendicular to the longitudinal direction of the flexible band.

BRIEF DESCRIPTION OF THE DRAWINGS

These and other objects, features and advantages of the present invention will be more apparent from the following description of the preferred embodiments taken in conjunction with the accompanying drawings in which.

DESCRIPTION OF THE PREFERRED EMBODIMENTS

Figure 3:
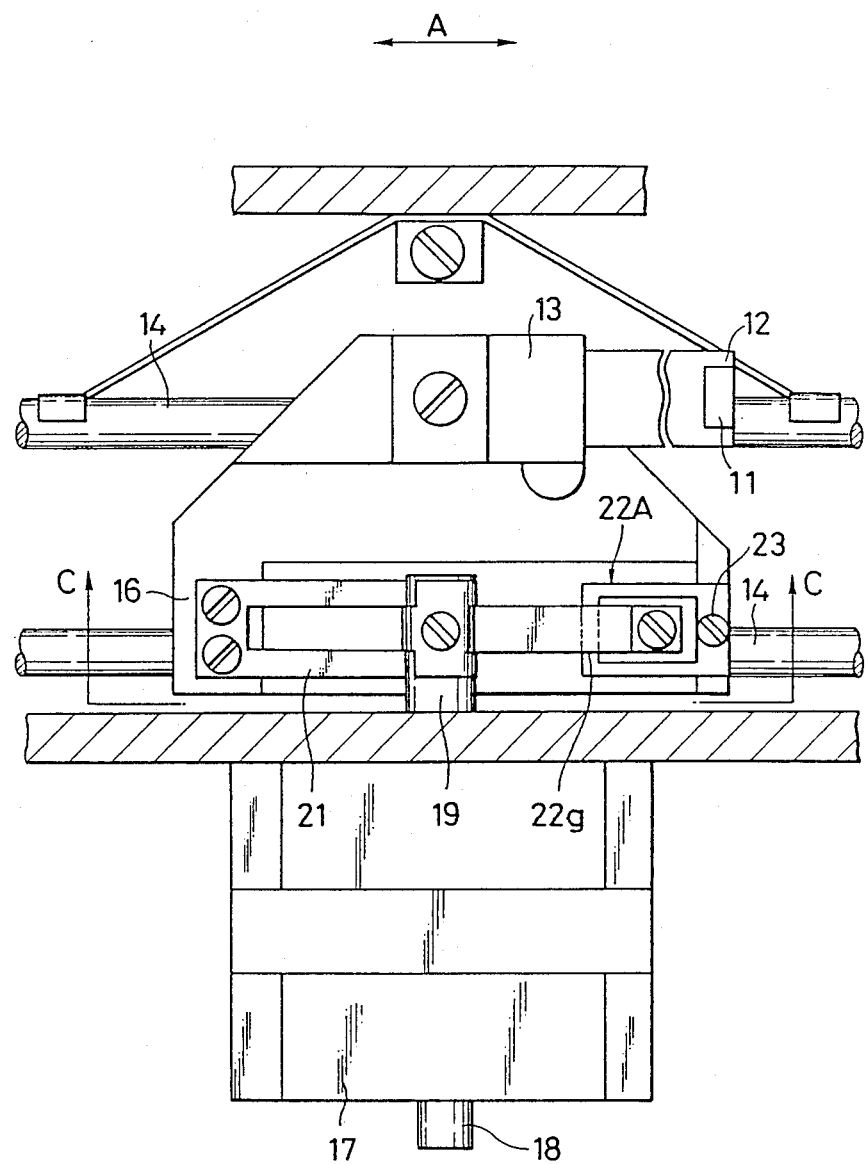
FIG. 3 is a plan view for a first embodiment of the present invention.
Figure 4:
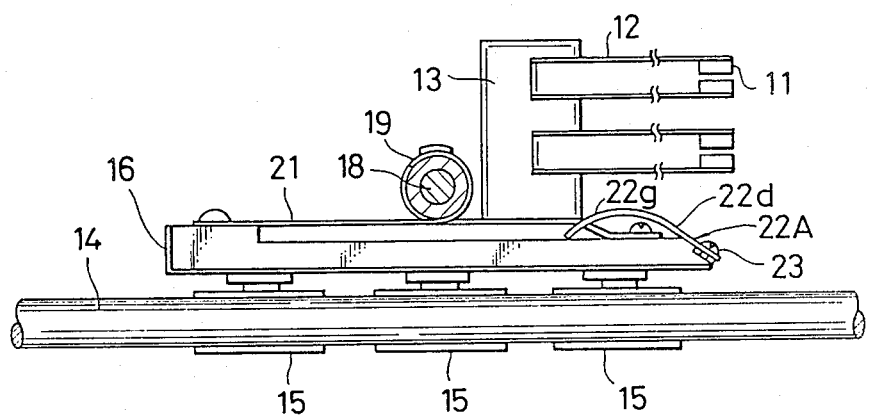
FIG. 4 is a sectional view as seen along the arrows C—C of the apparatus shown in FIG. 3.

In FIG. 3 and FIG. 4, a magnetic head 11 is fixed via a flexer 12 to a head stand 13, and the head stand 13 is fixed to a carriage 16 which is supported movably only in the direction A of the figure (the radial direction of the magnetic disc) by guides 14 and pulleys 15. On the carriage 16 there are fixed by screws or the like both ends of a flexible band 21 whose control portion is wound around and fixed by screws or the like to a roller 19 that is fitted to the shaft 18 of a stepping motor 17.

Figure 5:
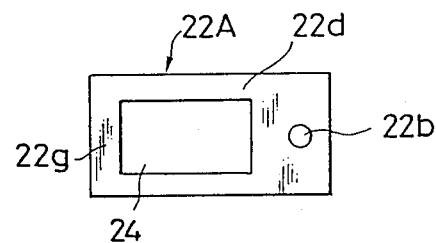
FIG. 5 is a plan view for the elastic member in accordance with the present invention.

On one end of the flexible band 21, there is joined an elastic member 22A shown in FIG. 5. The elastic member 22A is an elastic plate like member with relatively high stiffness that has an aperture 24 at about its center through which is inserted the flexible band 21. On one of its ends it has a tension adjusting hole 22b which is fitted to a tension adjusting screw 23, and on the other end there is formed a pressing section 22g which presses the flexible band 21 in the upward direction. The periphery of the aperture 24 is a tension adjusting region 22d which is joined to the pressing section 22g.

The flexible band 21 is inserted through the aperture 24 that is provided in the elastic member 22A by passing over the pressing section 22g, and is fixed to the carriage 16 under little tension. As shown in FIG. 4, one end of the carriage 16 is formed in a slope, and the elastic member 22A is fixed to this sloped section of the carriage 16 with the tension adjusting screw 23. This end may be given a stepped form as will be described later instead of forming a slope. By tightening the tension adjusting screw 23, the pressing section 22g of the elastic member 22A presses the flexible band 21 upward from down below. By tightening and loosening the tension adjusting screw 23, it becomes possible to give a predetermined tension to the flexible band 21.

Figure 6:
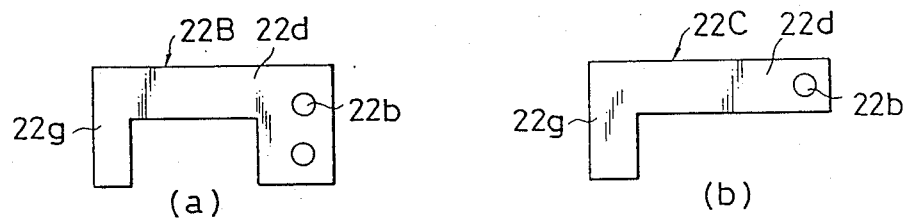
FIGS. 6 (a) and 6 (b) are plan views for modifications of the elastic member in accordance with the present invention.

In FIG. 6 are shown modifications of the elastic member 22A. Namely, FIG. 6 (a) shows the case in which an elastic member 22B is formed in the shape of letter U without forming an aperture 24, while FIG. 6 (b) shows the case in which an elastic member 22C is formed in the shape of letter L. In order to preclude the twisting or the like in the flexible band 21, a plurality of tension adjusting holes 22b may be provided depending upon the need.

In the magnetic head moving apparatus constructed in the above manner, it is possible to fix the flexible band 21 to the carriage 16 with little tension at the time when it is fixed. In addition, even after the assemblage, the tension in the flexible band 21 can be adjusted through the elastic member.

Namely, tension on the flexible band can be adjusted by varrying the pressure to the flexible band 21 of the pressing section 22g to the flexible band 21 which can be achieved by changing the deformation in the tension adjusting region 22d large or small through tightening or loosening of the tension adjusting screw 23 that is fitted to the tension adjusting hole 22b.

Figure 1:
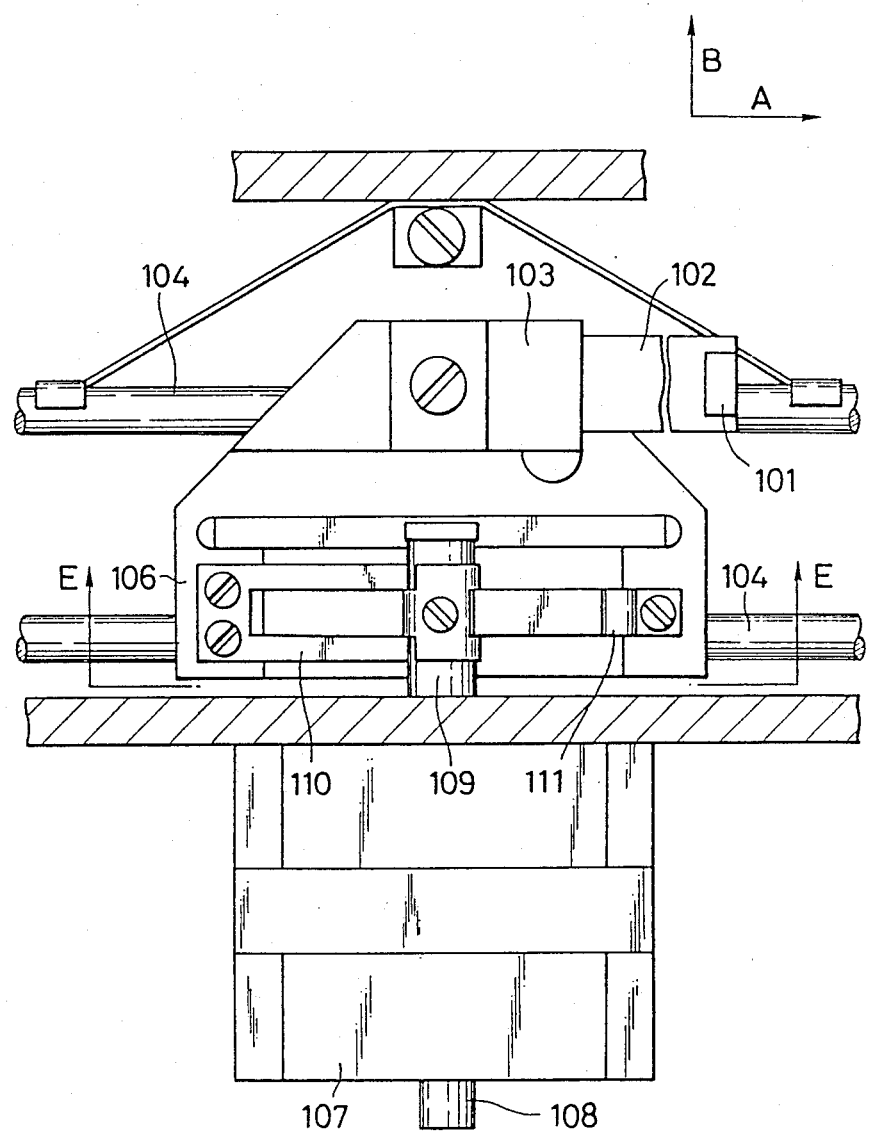
FIG. 1 is a plan view for showing a prior-art magnetic head moving apparatus.
Figure 2:
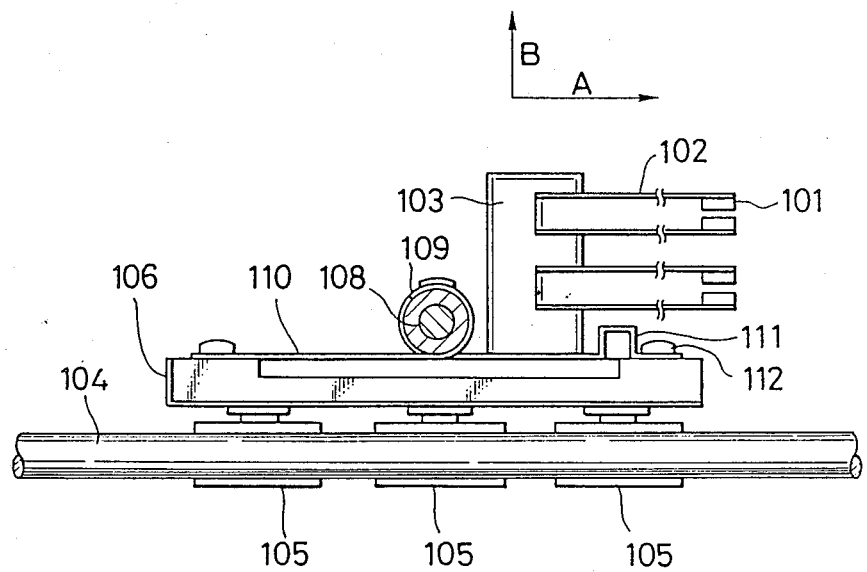
FIG. 2 is a sectional view as seen along the arrows E—E of the apparatus shown in FIG. 1.

In addition, as shown in FIG. 4, the direction of tightening of the tension adjusting screw 23 and the direction of the reactive force from the flexible band 21 on the tension adjusting screw 23 is approximately equal. Therefore, situations as occur in the prior art in which, as shown in FIG. 2, the direction of tightening of the screw 112 and the direction of the tension on the flexible band 110 are perpendicular to each other, will not take place in the present invention, so that there will occur neither a sideway sliding of the tension adjusting region 22d nor a change in tension after adjustment.

Figure 7:
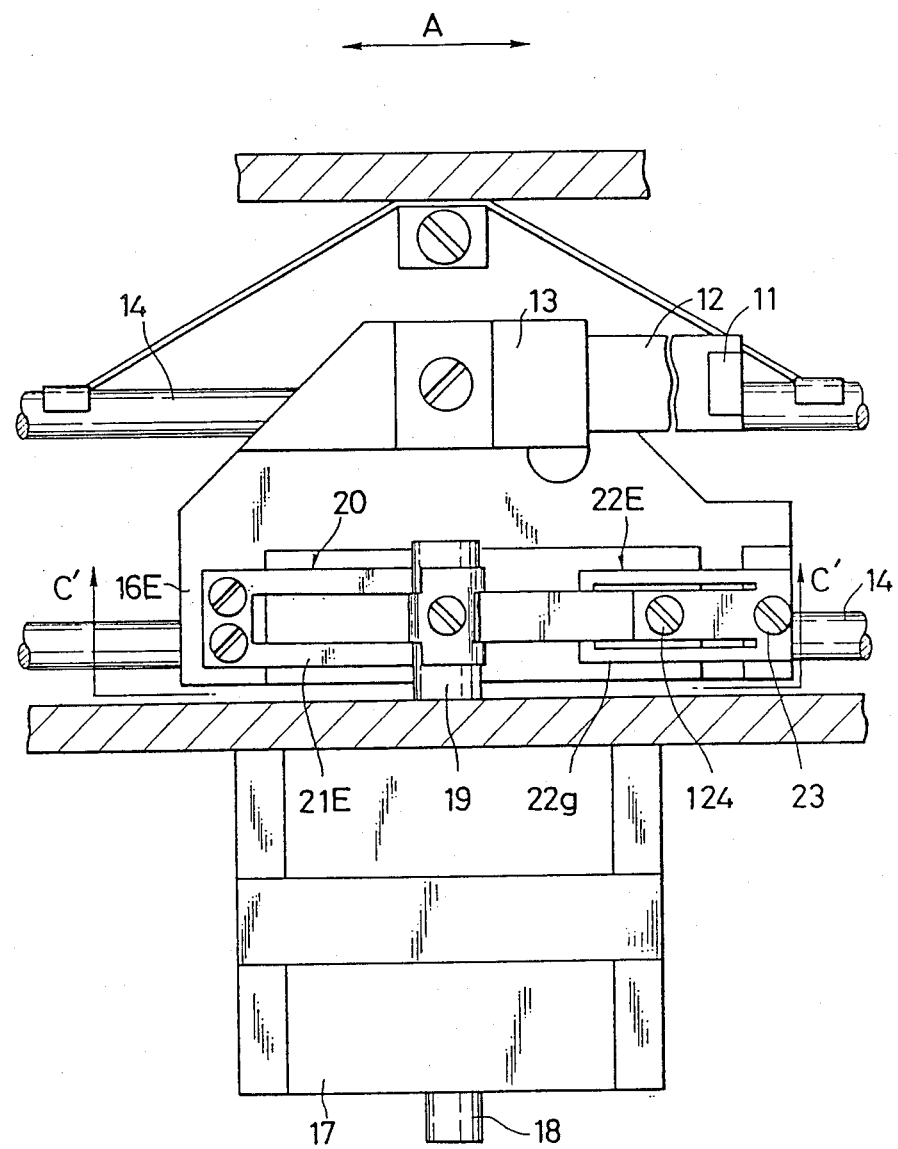
FIG. 7 is a plan view for a second embodiment of the magnetic head moving apparatus in accordance with the present invention.
Figure 8:
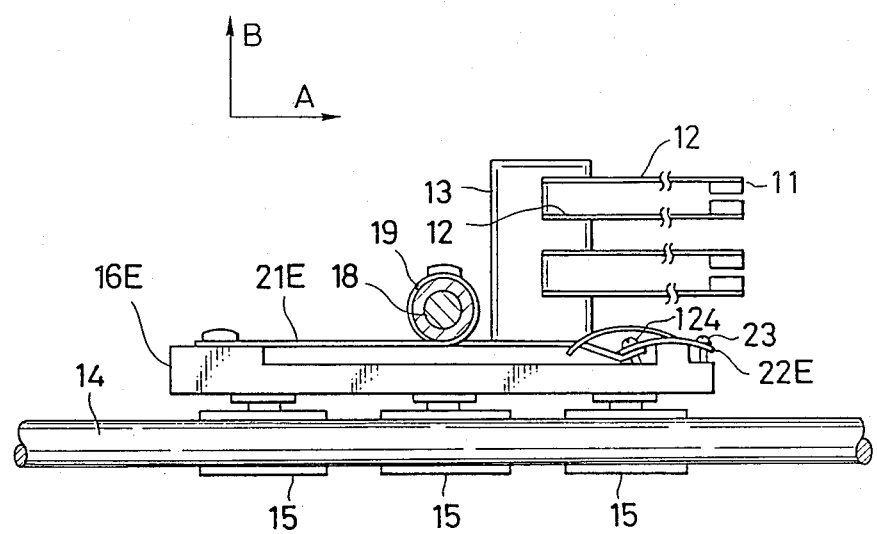
FIG. 8 is a sectional view as seen along the arrows C'—C' of the apparatus shown in FIG. 7.

FIG. 7 and FIG. 8 show a second embodiment of the present invention. In these figures, analogous to the first embodiment a magnetic head 11 is fixed via a flexer 12 to a head stand 13, and the head stand 13 is fixed to a carriage 16E which is supported to be movable only in the direction A in the figures by guides 14 and pulleys 15. On the carriage 16E there is fixed one end of a flexible band 21E whose central portion is fixed by screws or the like around a roller 19 which is fitted to a shaft 18 of a stepping motor 17. The other end of the flexible band 21E is fixed to a height adjusting region 22i of an elastic member 22E shown in FIG. 9.

Figure 9:
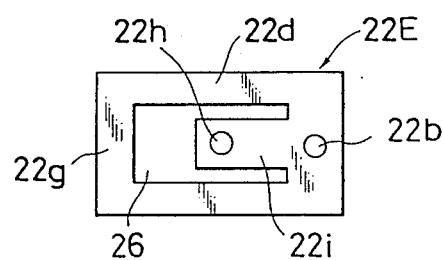
FIG. 9 and FIG. 10 are a plan view for the elastic member and a plan view for the elastic member and the flexible band, respectively, in accordance with the second embodiment of the present invention.

The elastic member 22E shown in FIG. 9 is a platelike member with relatively high stiffness that has at about its center an aperture 26 through which the flexible band 21E is inserted. On one end of the elastic member 22E there is provided a tension adjusting hole 22b which is fitted by a tension adjusting screw 23, and on the other end is formed a pressing section 22g which presses the flexible band 21E upward from down below. The periphery of the aperture 26 is joined to the pressing section 22g by a tension adjusting region 22d. In addition, from the side of the tension adjusting hole 22b of the tension adjusting region 22d toward the aperture 26, there is provided a height adjusting region 22i which is projected. On the height adjusting region, there is provided a height adjusting hole 22h for adjusting the setting position when the flexible band 21E is set on the carriage 16E.

The flexible band 21E is inserted through the aperture 26 provided in the elastic member 22E by being threaded over the pressing region 22g, and is fixed to the height adjusting region 22i, for instance, by laser welding or spot welding under a condition with little tension acting on it.

Figure 10:
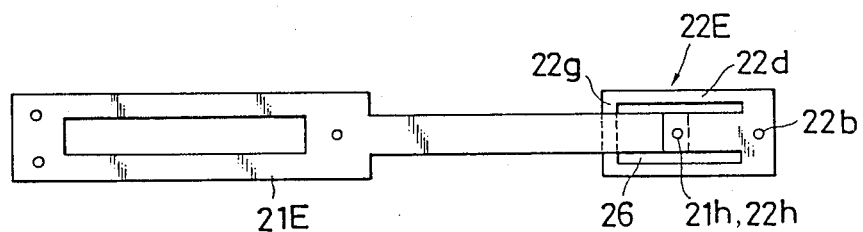
Figure 11:
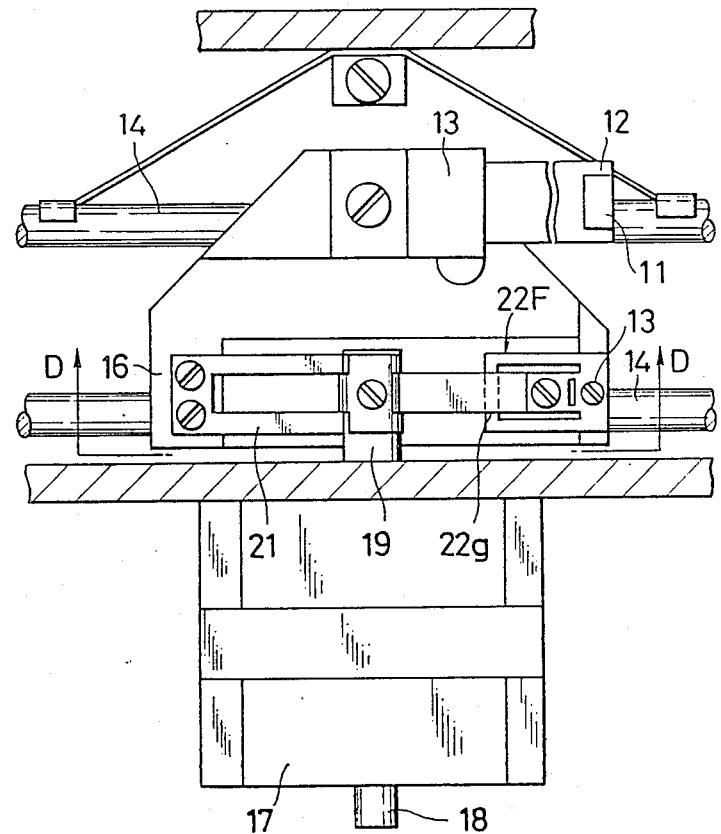
FIG. 11 is a plan view for a third embodiment of the magnetic head moving apparatus in accordance with the present invention.
Figure 12:
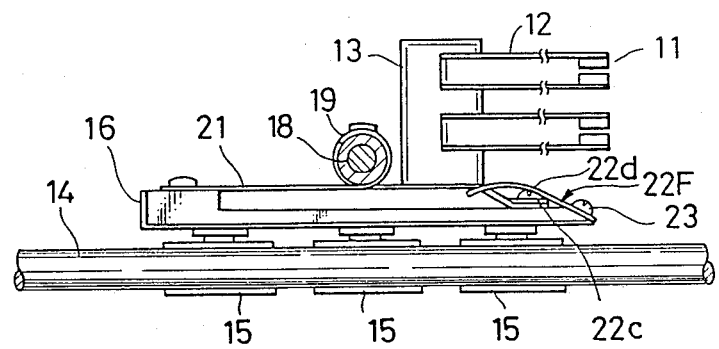
FIG. 12 is a sectional view as seen along the arrows D—D of the apparatus shown in FIG. 1.

In FIG. 8, one end of the carriage 16E is formed with a step. At a position one step below, there is arranged the tension adjusting region 22d with the tension adjusting hole 22b and is fixed there by tightening the tension adjusting screw 23. Further, the height adjusting region 22i with the height adjusting hole 22h is arranged also in a position which is one step low, and a hole 21h (see FIG. 10) that is provided in the flexible band 21E and the height adjusting hole 22h are aligned and fixed to the carriage 16E by tightening the height adjusting screw 124.

By fitting the tension adjusting screw 23 to the tension adjusting hole 22b in this manner, and by tightening the tension adjusting screw 23 with the tension adjusting region 22d faced toward the carriage 16E, the tension adjusting region 22d is bent and the pressing section 22g presses the flexible band 21E in the upward direction. As a result, it becomes possible to give a tension to the flexible band 21E.

Further, by fitting the height adjusting screw 124 to the height adjusting hole 22h, as shown in FIG. 9, and by tightening the height adjusting screw 124 with the height adjusting region 22i facing toward the carriage 16E, the height adjusting region 22i is deformed, and as a result, it becomes possible to adjust the setting height of the flexible band 21 on the carriage 16E.

Moreover, tension and setting height of the flexible band 21E are adjustable even after assembling is completed. That is, by tightening or loosening the tension adjusting screw 23 and the height adjusting screw 124, deformations in the tension adjusting region 22d and the height adjusting region 22i can be varied large or small. The tension and the setting height for the flexible band 21E can be adjusted by varying the pressing of the flexible band 21E in this way.

Still further, that the direction of tightening of the screw 112 and the direction of tension on the flexible band 110 are perpendicular, as was the case for the prior art apparatus shown in FIG. 2, will not occur in the present invention. As shown in FIG. 8, the directions of tightening of the tension adjusting screw 23 and the height adjusting screw 124 coincide nearly with the direction of the reactive force of the tension on the flexible band 21E, so that there will occur neither sideway slide of the tension adjusting region 22d and the height adjusting region 22i nor changes in tension and setting and setting height after the adjustments are completed.

Next, referring to FIGS. 11 to 14, a third embodiment of the present invention will be described. Here, identical or corresponding parts to those in FIGS. 3 to 5 will be given identical symbols to omit their detailed description.

Figure 13:
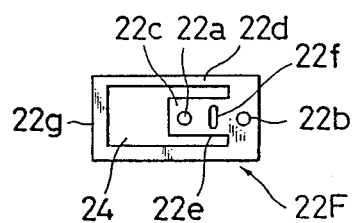
FIG. 13 is a plan view for the elastic member in accordance with the third embodiment of the present invention.
Figure 14:
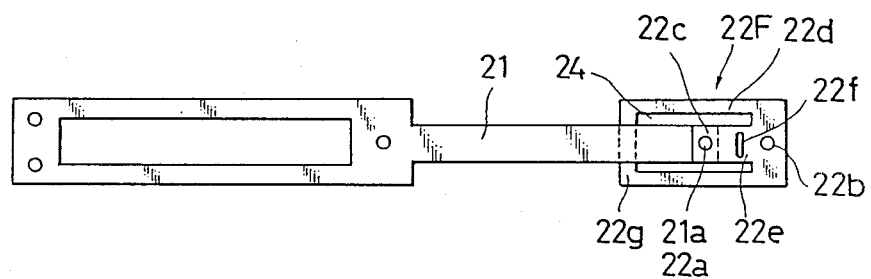
FIG. 14 is a plan view for the flexible band and the elastic member in accordance with the third embodiment of the present invention.

As shown in FIG. 13, in an elastic member 22F, there is provided a relay region 22e extending from the tension adjusting hole 22b side of the tension adjusting region 22d toward the aperture 24, and also there is provided a fixing region 22c that has a fixing hole 22a for fixing the relay region 22e to the carriage 16. In the relay region 22e, there is provided a long opening 22f in order to obtain an easy deformation for this region by allowing greater compliance to the region compared with other regions.

In addition, the flexible band 21 is fixed to the elastic member 22F by, for instance, laser welding or spot welding at the two locations of the fixing region 22c and the pressing region 22g of the elastic member 22F. The fixing region 22c and the flexible band 21 are fixed to the carriage 16 with a screw by aligning the fixing hole 22a and a hole 21a that is provided in the flexible band 21. Then, by inserting the tension adjusting screw 23 to the tension adjusting hole 22b and by tightening the screw with respect to the carriage 16, as in the first embodiment, the relay region 22e that has larger compliance is deformed locally, changing the relative angle of the tension adjusting region 22d to the fixing region 22c, to give a tension to the flexible band 21 by an upward pressing of the pressing region 22g.

In the third embodiment, a greater compliance is arranged to be given to the relay region 22e than for other regions by providing a long opening 22f. However, use may be made of a material with greater compliance for forming the relay region 22e instead of providing a long opening 22f.

In addition, instead of fixing the flexible band 21 by spot welding or the like at the two locations of the fixing region 22c and the pressing region 22g of the elastic member 22F, the pressing section 22g may be arranged to make a mere contact rather than fixing it.

Moreover, instead of directly fixing the flexible band 21 and the fixing region 22c by spot welding or the like, fixing of the flexible band 21 and the fixing region 22c to the carriage 16 may be realized by the use of a screw that fits the hole 21a formed in the flexible band 21 and the fixing hole 22a formed in the fixing region 22c.

As described in detail in the foregoing, according to the present invention it is possible to fix the flexible band to the carriage with almost no tension on it at the time of fixing the flexible band, so that workability can be improved without requiring special fixing tools. In addition, the tension on the flexible band can be adjusted even after completion of the fixing, and hence it becomes possible to carry out the motion of the magnetic head stably all the time.

Next, referring to FIGS. 15–18, a fourth embodiment of the present invention will be described. Here, parts that are identical or correspond to those in FIG. 11 to FIG. 14 are given identical symbols to omit their detailed description.

Figure 17:
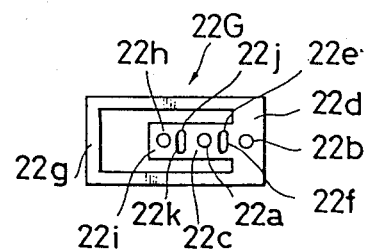
FIG. 17 and FIG. 18 are a plan view for the elastic member and a plan view for the elastic member and the flexible band, respectively, in accordance with the fourth embodiment of the present invention.
Figure 18:
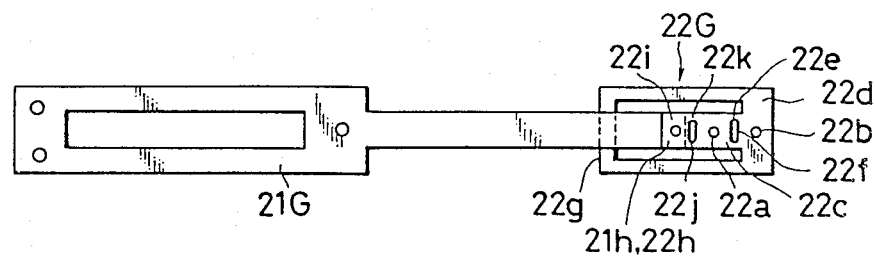

As shown in FIGS. 17 and 18, an elastic member 22G has a fixing region 22c that is formed between the tension adjusting region 22d and the height adjusting region 22i. In the fixing region 22c there is provided the fixing hole 22a for fixing the elastic member 22G to the carriage 16G to be fixed to the carriage 16G by means of a fixing screw 25.

In addition, there is provided the relay region 22e which connects the tension adjusting region 22d and the fixing region 22c, and a hole 22f is provided in the relay region 22e to give a greater compliance for the relay region 22e than for other regions to permit larger deformation for that region. Similarly, a relay region 22j is provided to join the fixing region 22c and the height adjusting region 22i, and a hole 22k is provided in the relay region 22j to give greater compliance for the relay region 22j than for other regions to permit larger deformation to that region.

Figure 15:
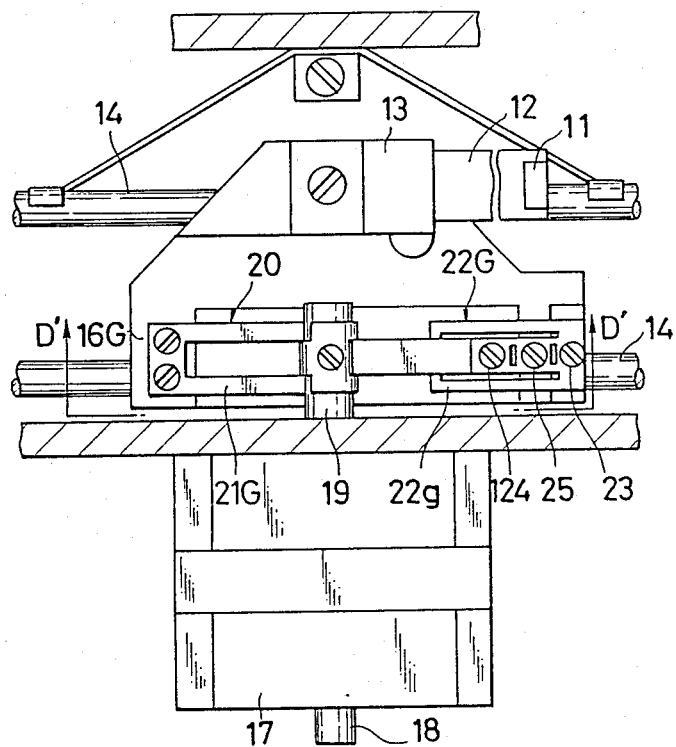
FIG. 15 is a plan view for a fourth embodiment of the magnetic head moving apparatus in accordance with the present invention.
Figure 16:
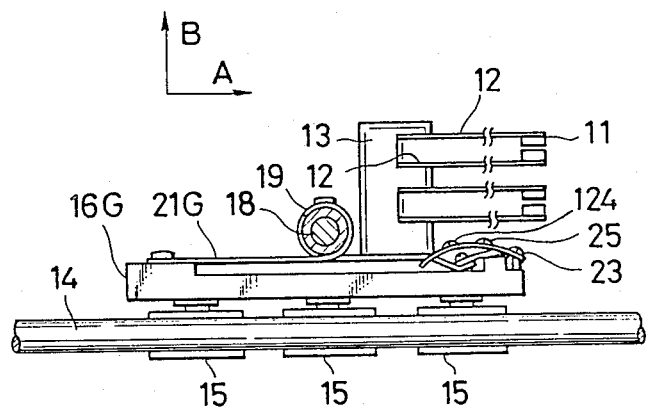
FIG. 16 is a sectional view as seen along the arrows D'—D' of the apparatus shown in FIG. 15.

The tension adjusting screw 23 is fitted to the tension adjusting hole 22b at a position in the carriage 16G which is by one step lower than the fixing position of the fixing region 22c, and tighten the tension adjusting screw 23 with the tension adjusting region 22d facing the carriage 16G. Then, the relay region 22e with greater compliance deforms locally, changing the relative angle of the tension adjusting region 22d with respect to the fixing region 22c, and the pressing section 22g presses the flexible band 21G in the upward direction. In this case, it becomes possible to give a predetermined tension to the flexible band 21G by adjusting the tightening force of the tension, as shown in FIGS. 15 and 16 adjusting screw 23.

Furthermore, by aligning hole 21h formed in the flexible band 21G and the height adjusting hole 22h at a position in the carriage 16G which is by one step lower than the fixing position of the fixing region 22c, and by inserting and tightening the height adjusting screw 124 with the height adjusting region 22i facing the carriage 16G, the relay region 22j with greater compliance is deformed locally, changing the relative angle of the height adjusting region 22j with respect to the fixing region 22c. Here, by adjusting the tightening force of the height adjusting screw 124 it becomes possible to determine the setting height of the flexible band 21G on the carriage 16G at a predetermined height.

As in the above, both of the setting height adjusting and the tension adjusting can be carried out by means of a single elastic member. In addition, there is no need to give a predetermined tension to the flexible band at the time of setting it on the carriage, and the tension can be adjusted after the flexible band is set, so that no use of special setting tools is required at the time of assembling.

In the above embodiment, greater compliance was given to the relay regions 22c and 22j than for the fixing region 22c, tension adjusting region 22d, and the height adjusting region 22i, by providing long openings 22f and 22k. However, instead of forming holes 22f and 22k, an arrangement may be made to form the relay regions 22e and 22j as elastic members with greater compliance.

Figure 19:
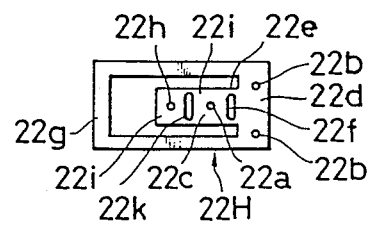
FIG. 19 and FIG. 20 are plan views for modifications of the elastic member in accordance with the present invention.

Further, as shown in FIG. 19, two or more tension adjustment holes 22b may be provided in the elastic member 22H. When the elastic member 22H has a wide enough width or when a large tension need by applied to the flexible band, it becomes possible to prevent the twisting of the flexible band by the use of two or more of the tension adjusting screws 23.

Moreover, in manufacturing the elastic members 22A to 22H that have been described in the foregoing, there is not required working that involves bending so that there is an advantage that the accuracy of the elastic member as a part can be improved.

Figure 20:
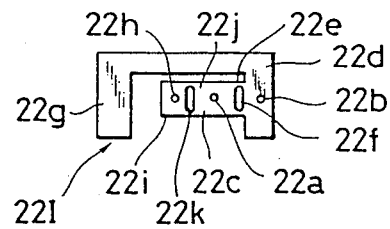

Furthermore, one side of the tension adjusting region 22d may be opened as shown for an elastic member 22I shown in FIG. 20.

As has been described in detail in the foregoing, according to the present invention, it is possible to adjust at will the setting height of the flexible band to the carriage and to maintain the flexible band and the carriage to be horizontal all the time. Therefore, feeding of the magnetic head can be carried out exactly with high accuracy without generating changes in the tension during the winding of the flexible band.

Figure 21:
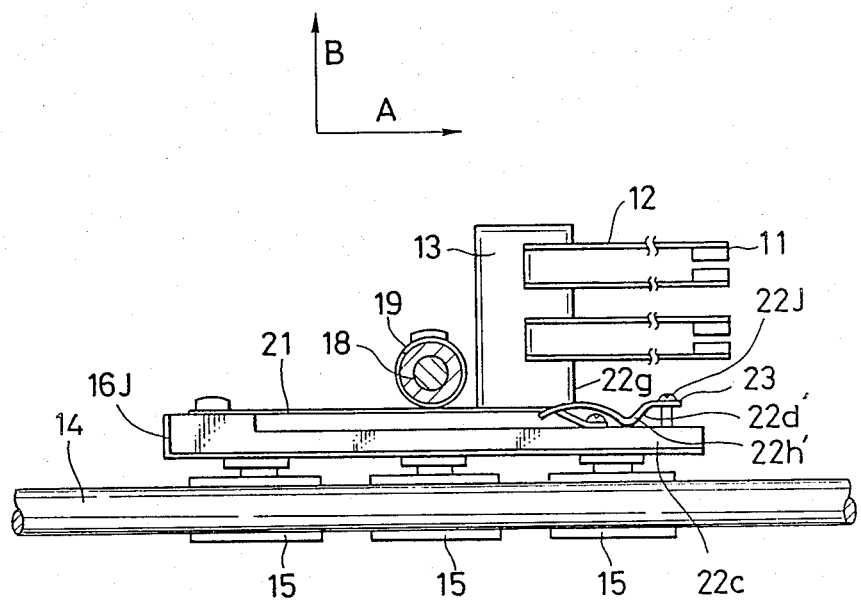
FIG. 21 is a side view for a fifth embodiment of the magnetic head moving apparatus in accordance with the present invention.

Referring to FIG. 21, a fifth embodiment of the present invention will be described. In the embodiments described earlier, a fulcrum for the elastic member was given by forming the end of the carriage on which is attached the elastic member was either formed as a slope or given a step. In the embodiment shown in FIG. 21, a protrusion 22h' is formed in a section of the tension adjusting region 22d' of an elastic member 22J, to utilize the protrusion 22h' as the fulcrum for the carriage 16J. The effects of the present invention will be found to be obtainable by this embodiment also.

Figure 22:
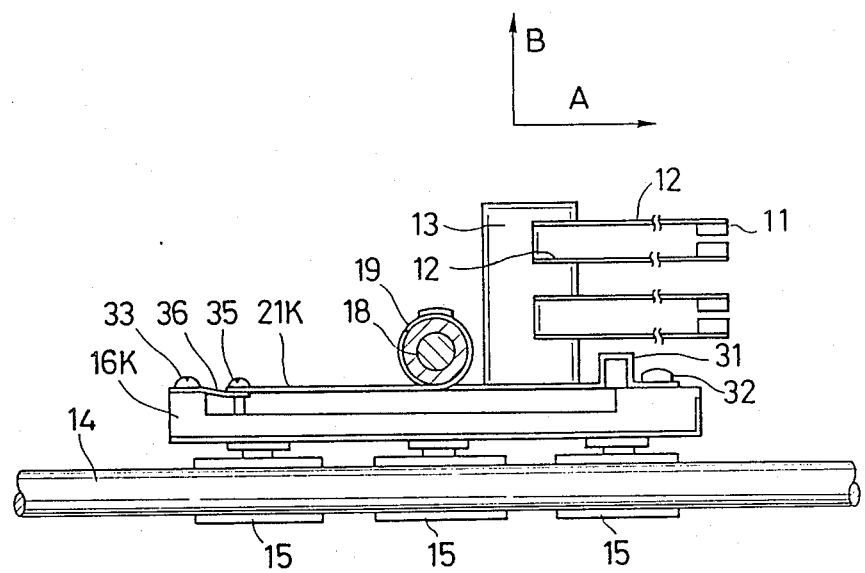
FIG. 22 is a side view for showing an embodiment of the adjusting means for the flexible band height of the present invention.

In FIG. 22 is shown a height adjusting means for the flexible band of the present invention. In FIG. 22 the magnetic head 11 is fixed via the flexer 12 to the head stand 13, and the head stand 13 is fixed to a carriage 16K which is supported by guides 14 and pulleys 15 that are movable in the direction A of the figure (the radial direction of the magnetic disc). On the carriage 16K, one end of a flexible band 21K, whose central part is wound and fixed by screw or the like to the roller 19 which is fitted to the shaft 18 of the stepping motor 17, is fixed by a screw 32 via a U-shaped elastic member.

The other end of the flexible band 21K is joined to one end of a plate-like elastic member 36 whose the other end is fixed by a screw 33 to the carriage 16K, and is attached to the carriage 16K with a height adjusting screw 35. The plate-like elastic member 36 gives a prepressure to the flexible band 21K, and the height of setting (direction B in FIG. 22) of the flexible band 21K can be adjusted by tightening or loosening the height adjusting screw 35.

Figure 23:
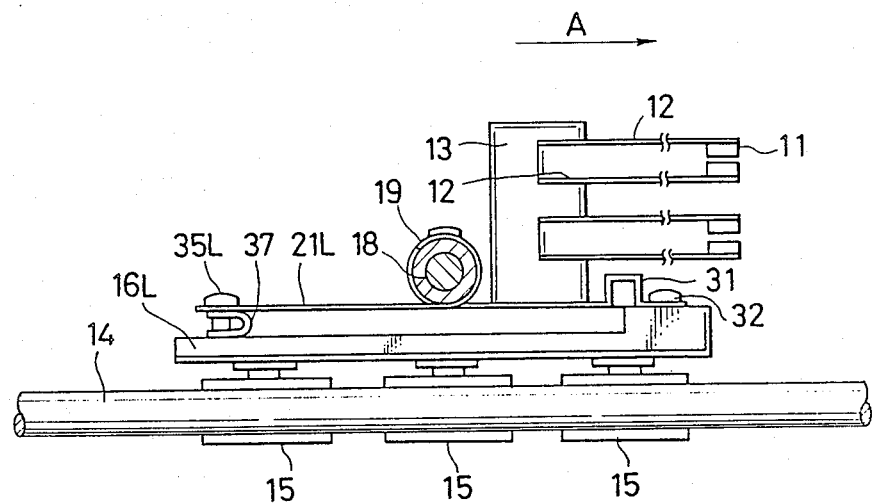
FIG. 23 and FIG. 24 are side views for showing modifications of the height adjusting means.

In FIG. 23, in place of a plate-like elastic member 36, an elastic member 37 with approximate cross section of letter U is interposed between a flexible band 21L and a carriage 16L. The flexible band 21L is set on the carriage 16L with a height adjusting screw 35L while giving a prepressure to the flexible band 21L by the U-shaped elastic member 37.

Figure 24:
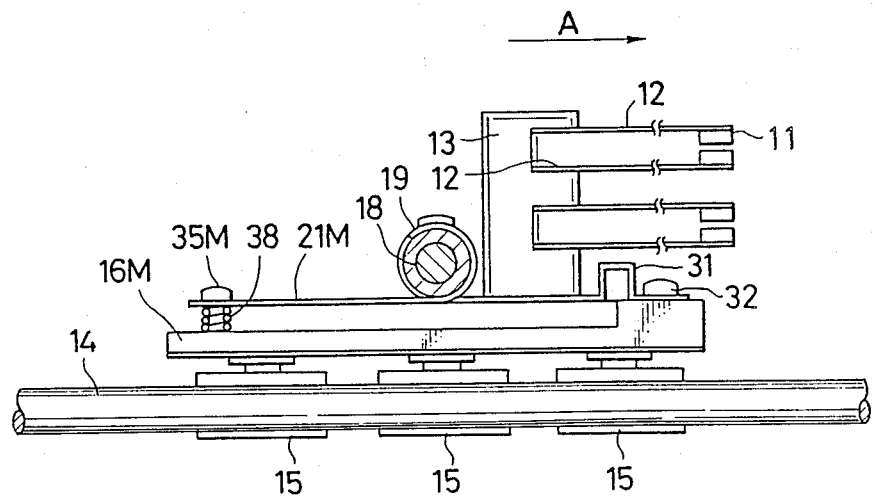

In FIG. 24, a flexible band 21M is set on a carriage 16M with a height adjusting screw 35M while giving a prepressure to the flexible band 21M by a spring 38.

In either of these cases it is possible to adjust the position of the setting height of the flexible band on the carriage, by tightening or loosening screw 35, 35L, or 35M. Therefore, it is possible to maintain the carriage and the flexible band in horizontal direction all the time.

It should be noted that in these cases an elastic member is interposed between the flexible band and the carriage in order to give a prepressure to the flexible band. However, such an elastic member does not have to be interposed there. Thus, for example, the flexible band may be fixed to the height adjusting screw by means of a height adjusting screw 35, 35L, or 35M and a nut (not shown), and relatively varying the setting height of the flexible band by varying the height of the height adjusting screw 35, 35L, or 35M through tightening or loosening of the screw.

What is claimed is:

1. A magnetic head moving apparatus comprising:
    a carriage supporting a magnetic head and guiding the magnetic head back and forth in a predetermined direction;
    a motor for driving said carriage;
    a flexible band wound around the rotating shaft of said motor, a first end of the flexible band being fixed to said carriage and a second end being supported by said carriage; and
    means fixed to said carriage for giving tension to said flexible band,
    one end of said tension giving means being fixed to said carriage, and the other end being engaged with the said flexible band near its second end for giving a predetermined tension to an approximately linearly extended portion of said flexible band by applying a force in a direction substantially perpendicular to the longitudinal direction of the approximately linearly extended portion of the flexible band.

2. The magnetic head moving apparatus as claimed in claim 1, wherein said tension giving means comprises a flat plate-like elastic member having at one end at least one tension adjusting hole for setting the elastic member on the carriage, and at the other end having a pressing section arranged under the flexible band for pressing the flexible band to the side opposite the carriage, said tension giving means further comprising a tension adjusting screw member disposed in the tension adjusting hole for pivotally moving the elastic member in a predetermined direction around a point of the carriage as a fulcrum, the elastic member being deformed by the pivotal movement thereof to press the flexible band by the pressing section on the side opposite the carriage.

3. The magnetic head moving apparatus as claimed in claim 2, wherein the flat plate-like elastic member is a rectangular member having an aperture at about its center, the flexible band being inserted through the aperture.

4. The magnetic head moving apparatus as claimed in claim 2, wherein the flat plate-like elastic member is a U-shaped member, the flexible band being inserted into the groove in the elastic member.

5. The magnetic head moving apparatus as claimed in claim 2, wherein the flat plate-like elastic member is L-shaped, one side thereof containing the tension adjusting hole and the other side thereof containing the pressing section.

6. The magnetic head moving apparatus as claimed in claim 3, wherein said elastic member further includes a height adjusting unit provided in the rectangular elastic member for adjusting the height of the flexible band with respect to the carriage, the height adjusting unit extending from the side of the elastic member containing the tension adjusting hole toward the aperture in the center of the elastic member, the height adjusting unit having a height adjusting hole and a height adjusting screw member which is inserted into the height adjusting hole and attaches the other end of the flexible band and the height adjusting unit to the carriage so as to adjust the height of the flexible band with respect to the carriage.

7. The magnetic head moving apparatus as claimed in claim 6, wherein a first long opening is provided in the portion of the height adjusting unit between the height adjusting hole and the tension adjusting hole to facilitate the distortion of the height adjusting unit.

8. The magnetic head moving apparatus as claimed in claim 7, wherein a second long opening is provided in the portion of the height adjusting unit between the first long opening and the height adjusting hole for facilitating the deformation of the height adjusting unit, a fixing hole and a fixing screw member inserted into the fixing hole being provided on the side of the first long opening with respect to the second long opening to fix the height adjusting unit to the carriage, said second long opening being provided between the height adjusting hole and the fixing hole.

9. The magnetic head moving apparatus as claimed in claim 4, wherein the elastic member includes a height adjusting unit extending from the side of the elastic member with the tension adjusting hole toward the groove to facilitate the adjustment of the height of the flexible band with respect to the carriage, in the height adjusting unit there is provided a height adjusting hole to set the height adjusting unit on the carriage so as to adjust the height of the flexible band, in the portion of the height adjusting unit between the height adjusting hole and the tension adjusting hole there is provided a first long opening for facilitating the deformation of the height adjusting unit, and in the portion of the height adjusting unit between the first long opening and the height adjusting hole there are provided a second long opening for faciliating the deformation of the height adjusting unit, a fixing hole and a fixing screw member inserted into the fixing hole for for fixing the height adjusting unit to the carriage, whereby the second long opening is provided on the side of the height adjusting hole and the fixing hole is provided on the side of the first long opening.

10. The magnetic head moving apparatus as claimed in claim 2, wherein the elastic member has a projection protruding toward the carriage from an area between the tension adjusting hole and the pressing section, the projection providing to the elastic member a fulcrum with respect to the carriage.

11. The magnetic head moving apparatus as claimed in claim 2, wherein the elastic member is attached to a sloped section of the carriage by a tension adjusting screw member through the tension adjusting hole, and the tension to the flexible band is adjusted by the adjustment of the tension adjusting screw member.

12. The magnetic head moving apparatus as claimed in claim 2, wherein the elastic member is attached to a stepped section of the carriage by a binding means through the tension adjusting hole, and the tension to the flexible band is adjusted by the operation of the binding means.

13. The magnetic head moving apparatus as claimed in claim 1, further comprising means for variably adjusting the tension on the flexible band by the tension giving means without disassembling the apparatus.

14. The magnetic head moving apparatus as claimed in claim 1, wherein the tension giving means includes a height adjusting element for adjusting the height of the flexible band in relation to the carriage.

* * * * *